(12) United States Patent
Graeber et al.

(10) Patent No.: US 8,506,873 B2
(45) Date of Patent: Aug. 13, 2013

(54) METHOD FOR PRODUCING A FIBRE-COMPOSITE COMPONENT

(75) Inventors: Rainer Graeber, Hamburg (DE); Maksim Podkorytov, Braunschweig (DE); Matthias Meyer, Cologne (DE); Lars Herbeck, Heidenheim (DE)

(73) Assignee: Airbus Operations GmbH, Hamburg (DE)

( * ) Notice: Subject to any disclaimer, the term of this patent is extended or adjusted under 35 U.S.C. 154(b) by 311 days.

(21) Appl. No.: 12/681,641

(22) PCT Filed: Sep. 25, 2008

(86) PCT No.: PCT/DE2008/001585
§ 371 (c)(1),
(2), (4) Date: Apr. 5, 2010

(87) PCT Pub. No.: WO2009/049583
PCT Pub. Date: Apr. 23, 2009

(65) Prior Publication Data
US 2010/0289188 A1    Nov. 18, 2010

(30) Foreign Application Priority Data
Oct. 18, 2007    (DE) .................. 10 2007 050 312

(51) Int. Cl.
*B29C 67/00* (2006.01)
(52) U.S. Cl.
USPC ........... 264/490; 264/417; 264/420; 264/432; 264/474; 264/489; 264/1.27; 264/1.37; 264/402; 264/405

(58) Field of Classification Search
USPC ............... 264/640, 641, 642, 913, 45.1–45.3, 264/486–496, 1.24, 2.4, 2.7, 46.8, 66.9, 265, 264/266, 901, 903, 402, 405, 430, 432, 449, 264/456–459, 460–463, 474, 476, 479–481, 264/239, 241, 247, 417, 420, 1.27, 1.37
See application file for complete search history.

(56) References Cited

U.S. PATENT DOCUMENTS

| 4,639,343 | A  | * | 1/1987  | Long et al. ................. | 264/45.5 |
|-----------|----|---|---------|------------------------------|----------|
| 5,866,060 | A  | * | 2/1999  | Buckley ....................... | 264/463  |
| 6,261,395 | B1 | * | 7/2001  | Duffy ........................... | 156/64   |
| 2004/0238794 | A1 | * | 12/2004 | Karandikar et al. .......... | 252/500 |
| 2007/0235450 | A1 | * | 10/2007 | Quantrille et al. ............ | 219/730 |
| 2007/0241478 | A1 | * | 10/2007 | Buckley ...................... | 264/257 |

FOREIGN PATENT DOCUMENTS

| DE | 19731903 | 7/1997 |
|----|----------|--------|
| DE | 10360743 | 7/2005 |
| EP | 0347299  | 6/1989 |

* cited by examiner

*Primary Examiner* — Jeffrey Wollschlager
*Assistant Examiner* — Stella Yi
(74) *Attorney, Agent, or Firm* — Whitham Curtis Christofferson & Cook, PC

(57) ABSTRACT

The invention relates to a method for producing a fiber composite component, comprising the steps: introduction of a first body (12), consisting of fibers and a matrix material, into a mold (10), said first body (12) having a continuous first body edge (18); the first body (12) is irradiated with microwaves (28) to produce a fiber-composite component. According to the invention, the first body (12) is introduced into the mold (10) in such a way that at least parts of the first body edge (18) are brought into contact with the mold (10).

8 Claims, 5 Drawing Sheets

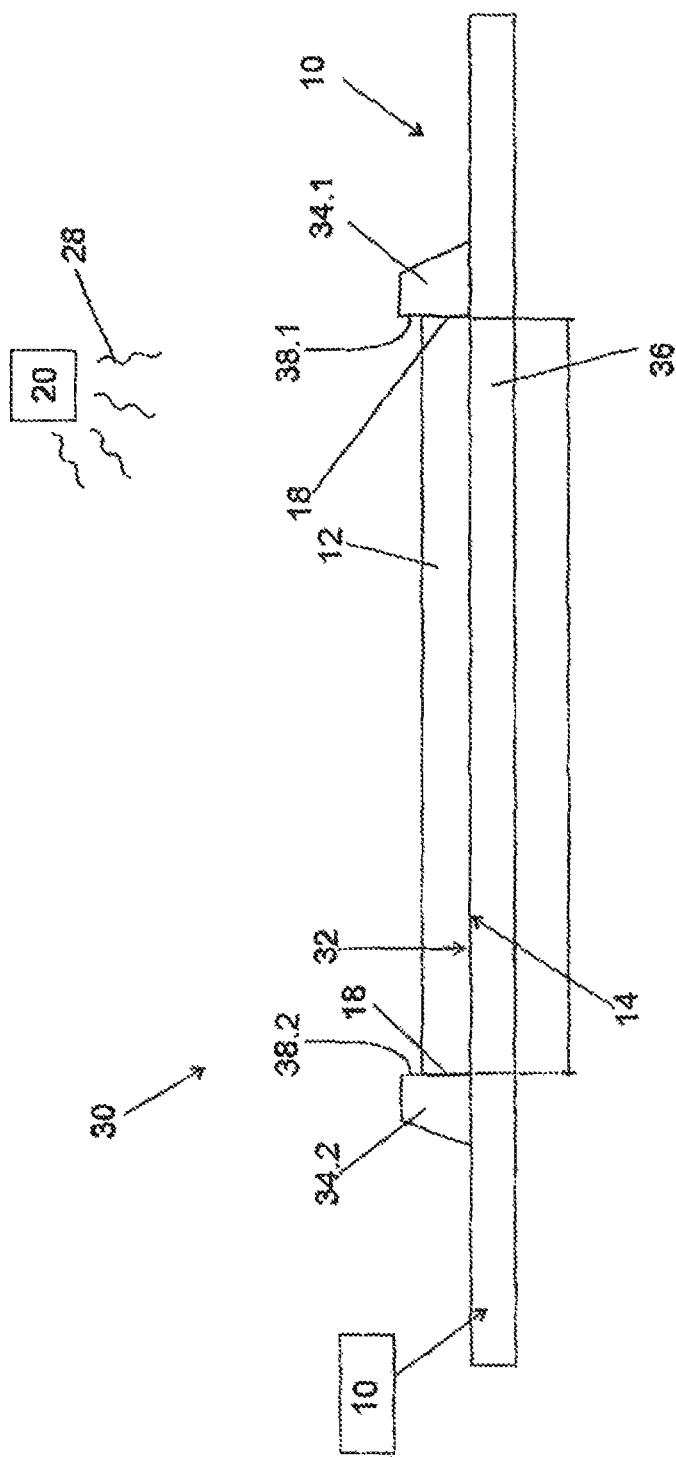

Figure 1:
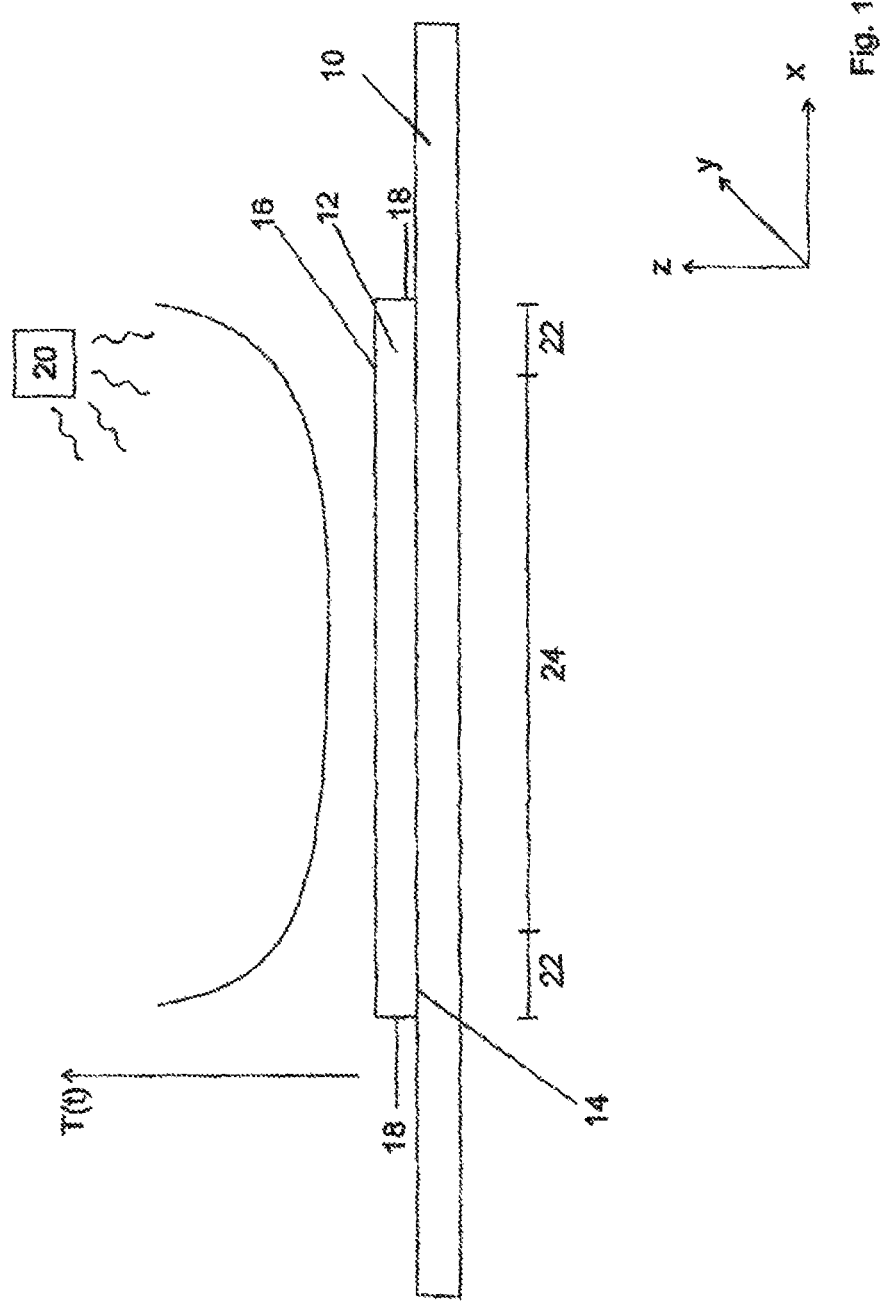

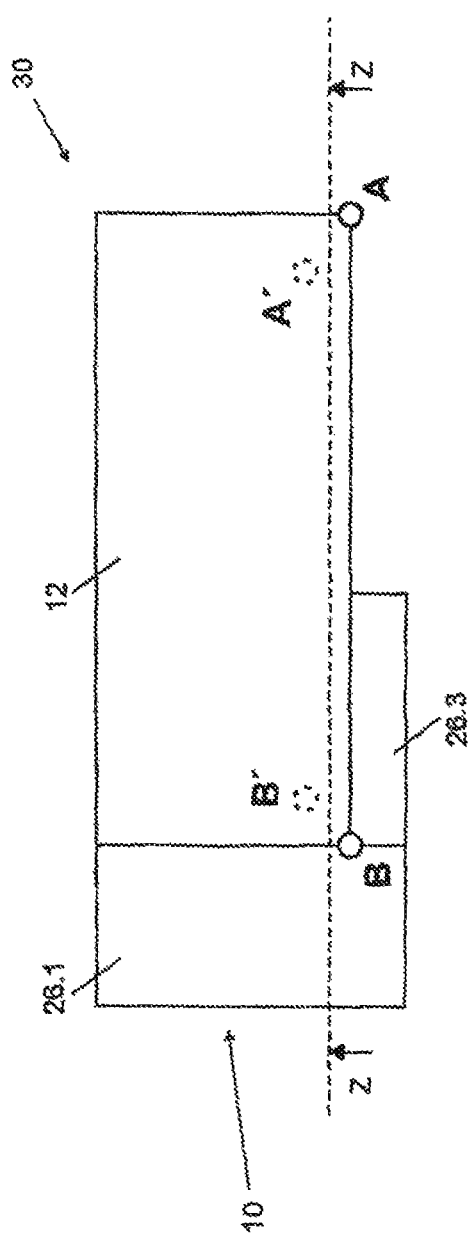
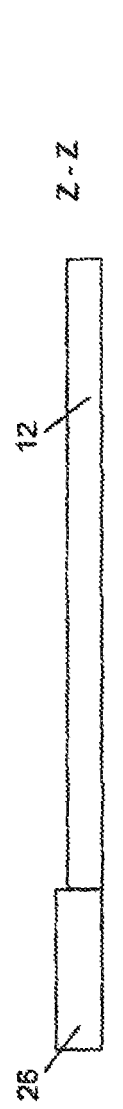

METHOD FOR PRODUCING A FIBRE-COMPOSITE COMPONENT

The invention relates to a method for producing a fiber-composite component, with the steps of (a) introducing a preform of fibers and matrix material into a mold, the preform having a peripheral preform border, and (b) irradiating the preform with microwaves, so that a fiber-composite component is created.

Fiber composite components of fiber reinforced plastics are innovative materials which consist of two components, namely (reinforcing) fibers and a matrix material. An increasing number of components, in particular in high-tech branches of industry such as aeronautics and aerospace and in automobile construction, are no longer produced from metal but for example from carbon fiber reinforced thermoplastics or thermosets.

Thermal energy is often used to produce the fiber-composite component. Once the preform of fibers and matrix material has been introduced into the mold, both are heated. This has the effect of initiating a polymerization of the matrix material, and the fibers and the matrix material adhesively bond to one another, so that the fiber-composites component is created.

Heating may be performed, for example, by means of collection. Alternatively, a microwave field, may be used for heating the preform. The interaction with the microwave field has the effect that dipole molecules of the matrix material are made to vibrate, so that the matrix material heats up. It has been found that irradiation with microwaves pauses considerable temperature gradients to occur in the preform. The highest temperatures are found at the borders of the preform or of the fiber-composite component crested. Such temperature gradients are undesired and have previously been reduced by attaching metal foils that shield the microwave radiation to the borders of the preform. Disadvantages of this are the considerable manual effort involved in applying the metal foils and the risk that incorrectly applied metal foils may cause defects in the fiber-composite component created.

DE 103 60 743 A1 discloses a method for producing structural components from fiber-composite plastics which comprises two method steps, namely a preforming and a forming. No details are given about the arrangement of the peripheral border in the mold.

DE 197 31 903 A1 discloses a method for producing a roof module or sliding roof for vehicles. In this method, a foam sheet is surrounded on all sides by fiber mat impregnated with epoxy resin and is introduced into a pressing mold in such a way that it is isolated from the pressing mold by means of a multilayer film or by means of a fabric. This multilayered structure is subsequently pressed to form the roof module. Enclosure in the multilayer film or the fabric means that arcs cannot occur.

EP 0 347 299A1 discloses a method for producing a fiber-composite component from glass fibers in which a mold of plastic is used. The mold has pressure parts, which exert a mechanical pressure on the perform. The method described there is not suitable for large-area components that have to be produced with great accuracy.

The invention addresses the problem of overcoming disadvantages in the prior art. The invention solves the problem by a method of the type in question in which the preform is introduced into the mold in such a way that the preform border is brought into contact with the mold at least partly, but with preference substantially completely.

An advantage of the invention is that the formation of temperature gradients in the preform under irradiation with microwaves is reduced. As a result, fiber-composite components of high quality cap be produced. A further advantage is that preliminary manual work becomes largely superfluous, so that the method is well-suited for automation. As a result, low-cost production is made possible, with at the same time reproducible quality.

It is also advantageous that the invention can be easily implemented. For instance, it merely requires new molds or a modification of existing molds, which can in principle be used as often as desired.

If the preform is a substantially right-parallelipipedal component, the preform border is understood as meaning the entirety of its narrow sides.

The preform is, in particular, homogeneous. This is to be understood in particular as meaning that its structure is locationally independent. In particular, the preform is not made up of constituent parts that are in themselves independent. For example, the preform is free from any joins. If, according to a favorable embodiment, the preform is a matrix-material/fiber system, the preform preferably consists exclusively of fibers and matrix material.

The component is, with preference, a component of a flat form. This is to foe understood in particular as meaning that, once production has been completed, the component is free from undercuts, or merely has one of the undercuts at its border. For example, the component of a flat form is part of an aircraft. For example, the component of a flat form is part of the fuselage, the wings or the tail unit.

The mold is formed with preference in such a way that, during irradiation, the microwaves impinge directly on the preform. That is to say that the mold is, with preference, free from undercuts with respect to a microwave source that is used for irradiating the preform with microwaves.

In a preferred embodiment, the preform is brought into contact with the mold substantially completely with the preform border. The feature that the preform is brought into contact substantially completely is to be understood as meaning that it is not necessary for the preform to be brought into contact completely in the strictly mathematical sense. Rather, it is sufficient if individual small parts of it are not in contact with the mold. The advantage of this is that the preform experiences sufficiently small temperature gradients substantially over its entire border to achieve a high quality of the fiber-composite component.

At the point at which it is brought into contact with the preform border, the mold has, with preference, a thickness or depth that is chosen to be sufficiently great for the mold to be able on the basis of its thermal capacity to absorb heat occurring in an area surrounding the preform border to such an extent that, with a prescribed microwave power, a prescribed temperature is not exceeded at any point of the fiber-composite component.

In a preferred embodiment, the preform is irradiated with microwaves without any obscuration. This is to be understood in particular as meaning that the mold is free from undercuts or the preform can be reached by the microwaves from all exposed sides. In particular, no metal foils are attached to the preform.

Apart from the thermal contact, in order also to produce particularly good electrical contact between the preform and the mold, an electrically conducting mold, in particular a metal mold, is used with particular preference. The mold may, for example, be produced from steel and/or a nickel alloy. If, for example particularly nigh thermal and/or electrical conductivity is desired at the points of the mold that come into contact with the preform border, metals that are particularly thermally or electrically conductive, such as for example copper or silver, are used with preference.

It is particularly preferred that the preform is introduced into the mold in ouch a way that the preform is in electrical contact with the mold with the preform border in this case, the formation of small arcs between the fibers or the matrix material on the one hand and the mold on the other hand is reduced or even avoided. The formation of small areas such as this is also referred to as arcing.

It is preferred that microwaves with an intensity that is chosen such that arcing specifically is substantially suppressed are used for the irradiation. The feature that the arcing is substantially suppressed is to be understood as meaning that it is advantageous but not necessary for the formation of arcs to be completely suppressed. It is possible to tolerate the formation of arcs to the extent that later usability of the fiber-composite component created is not decisively impaired.

In order to suppress the temperature gradient at the border particularly effectively, it is provided in a preferred embodiment that the preform is introduced into a cooled in particular actively cooled, mold, the mold being cooled in particular at points that come into contact with the preform border. It is alternatively also possible that the mold is cooled at those points that are quite generally in contact with outer regions of the preform. If temperature gradients occur in the border region of the preform, this can be counteracted by active cooling.

With preference, the fibers comprise carbon fibers. On account of the electrical conductivity of the carbon fibers, preforms of carbon fibers and matrix materials are particularly susceptible to the formation of arcs and to temperature gradients in the border region. It is particularly preferred that the matrix material can be cured by polymerization, in particular by heat-induced polymerization. The heat input may be the only polymerization-initiating mechanism, but does not have to be.

The invention is explained in more detail below on the basis of an exemplary embodiment.

Figure 2:
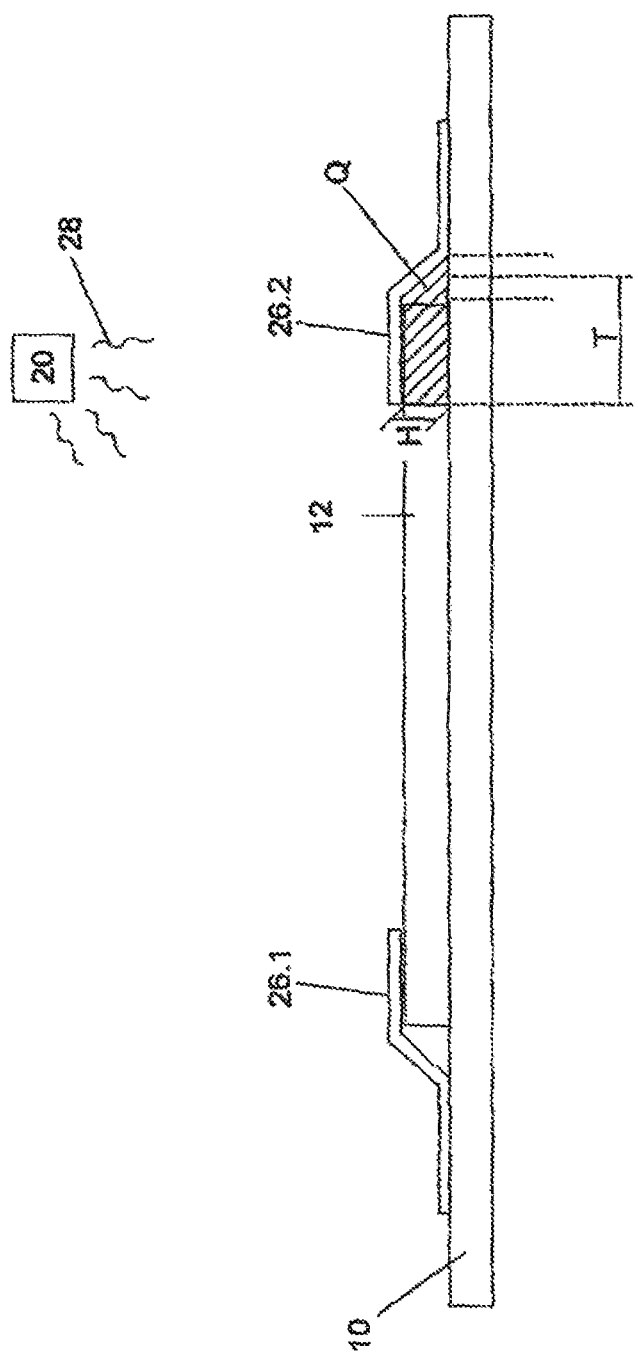
Figure 4C:
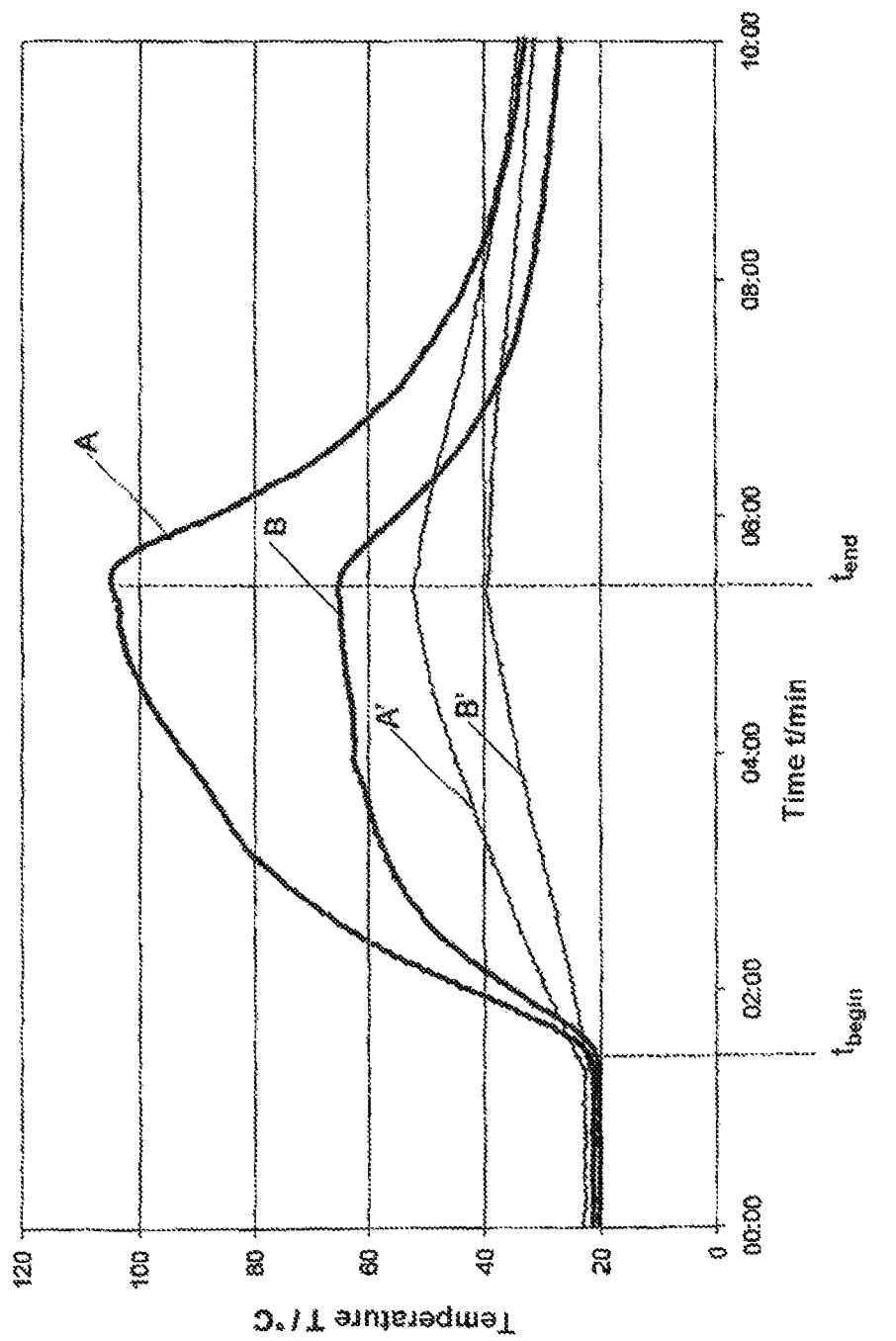

FIG. 1 shows a schematic representation which plots the temperature in a preform under irradiation with microwaves against its spatial extent, FIG. 2 shows a mold according to the prior art and FIG. 3 shows a schematic view of a fiber-composite component production device;

FIG. 4a shows a test arrangement, which is constructed partly according to the prior art and partly according to the invention, FIG. 4b shows a cross-sectional view along the section Z-Z as shown in FIG. 4a and FIG. 4c shows four temperature curves, which plot the temperature of the test arrangement as shown in FIG. 4a in the border region ever time, two curves representing the temperature development for a mold according to the prior art and two curves representing the temperature development for a mold of a fiber-composite component production device.

FIG. 1 schematically shows a mold 10 of metal, in the present case of steel, on which a preform 12 in the form of a laminate of fibers and matrix material is built up. The preform 13 is substantially right-parallelipipedal, with a bearing area 14, an irradiating area 16, lying opposite the bearing area 14, and a preform border 18, arranged between the bearing area 14 and the irradiating area 16. When the preform 12 is irradiated with microwaves from a microwave source 20, the preform 12 heats up and the temperature profile T(x) shown occurs. It can be seen that the temperature T in the border region 22 is higher than in a core region 24 of the preform 12. The border region 22 extends front the preform border 18 to approximately 10% of an inward extend of the preform 12. The resultant temperature gradient, that is to say the changes in the temperature with increasing distance from the preform border 18, is undesired.

FIG. 2 shows a mold 10 according to the prior art, which has shieldings 26.1, 26.2. The shieldings 26.1, 26.2 bring about an obscuration of the microwaves 28 emanating from the microwave source 20 through an undercut with the cross section Q, so that the formation of the temperature gradient shown in FIG. 1 is reduced. An average depth T of the cross section Q is, with preference, less than 80 mm. A height H is, with preference, less than 50 mm.

FIG. 3 shows a fiber-composite component production device 30 according to the invention, for producing a fiber-composite component from a preform 12. The mold 10, which is part of the fiber-composite component production device 30, is produced from metal and has a base area 32, which is in contact with the bearing area 14 of the preform 12 during operation and in the present case is substantially planar. However, the base area 32 does not necessarily base to be planar, bat may in principle foe of any desired form. In order not to obscure the microwaves 28, the base area 32 is free from undercuts. That is to say that there is a location for the microwave source 20 from which the microwaves 28 can reach every point of the base area on a direct path. The base area 32 is also advantageously tree from undercuts for technical production-related reasons. For many applications, the base area is convex or concave or consists of convex or concave sub-areas adjoining one another.

Extending substantially perpendicularly upward from the base area 32 are two side elements 34.1, 34.2 of metal. These may be detachably attached to a main element 36. Alternatively, the side elements 34.1, 34.2 are formed in one piece on the main element 36. The side elements 34.1, 34.2 have respective mold borders 38.1, 38.2, which are facing the preform border 18 of the preform 12 and lie against the preform border 18. The mold borders 38.1, 38.2 stand on the base area 32 without any undercuts, that is to say that a fiber-composite component originating from the preform 12 can be removed from the mold 10 even if it is ideally rigid. The side elements 34.1, 34.2 do not have to be removed for this purpose. This is achieved in particular if a projection of the mold border 38.1, 38.2 onto the base area 32 lies outside the bearing area 14. In an alternative configuration, one side element or both side elements 34.1, 34.2 may be detachably and displaceably connected to the main element 36. Removal of the fiber-composite component from the mold can be followed by a subsequent working step, in particular deforming, forming, bending, painting, cleaning, machining, polishing, grinding, eroding, coating, and/or fitting.

The fiber-composite component production device 30 also comprises the microwave source 20 and a housing (not depicted), which reflects microwaves 28 and prevents microwaves 28 from being emitted into a surrounding area beyond the housing.

FIG. 4a shows a fiber-composite component production device 30 which comprises a pyrometer (not depicted), which measures the temperature T of the preform 12 at the points identified by A' and B'. The microwave source 20 (of FIG. 3) can be activated by means of an electrical control in such a way that a prescribed temperature gradient or a prescribed maximum temperature on the preform 12 is not exceeded. If the temperature gradient and/or the temperature becomes too high, the electrical controller may adjust the microwave source to a lower power level, so that the temperature differences even out as a result of heat conduction processes into the mold 10 or excessively high temperatures are brought down by heat conduction into side elements 34 of the mold 10. In addition, cooling channels that counteract excessive heating of the preform 12 or the formation of an excessively steep temperature gradient may be installed in the border region 22.

FIG. 4a shows a preform 12, which is placed in a mold 10, which is constructed on its left-hand side in FIG. 4a like the mold according to FIG. 3 and on its right-hand side like a mold according to FIG. 2. At points identified by A and B, the temperature is measured with a thermocouple. In the regions A' and B', shown by dashed circles, the temperature of the preform 12 is measured with a pyrometer.

FIG. 4b shows a cross section along Z-Z. The temperature curves recorded are plotted in FIG. 4c against time, during which the preform 12 is irradiated with microwave power of 800 W, beginning at $t_{begin}$ and ending at $t_{end}$. It can be seen that the measured temperatures rise much less on the left-hand side than on the right-hand side. Since the overall energy per unit area exposed to irradiation is constant, this shows the more homogeneous heating of the preform 12 when a mold according to the invention is used. The preform 12 has a width of approximately 300 mm, a height of less than 20 mm. In particular less than 10 mm. It also has a depth of about 120 mm.

LIST OF DESIGNATIONS 10 mold
12 preform
14 bearing area
16 irradiating area
18 preform border
20 microwave source
22 border region
24 core region
26.1, 26.2 shielding
28 microwave
30 fiber-composite component production device
32 base area
34.1, 34.2 side element
36 main element
38.1, 38.2 mold border

The invention claimed is:

1. A method for producing a fiber-composite structural aircraft component, which is part of a fuselage, wings or a tail unit of the aircraft, comprising the steps of:
   (a) introducing a preform, which consists of fibers and polymeric matrix material and has a back portion, a front portion and a peripheral preform border, into a mold that is electrically conductive, such that said back portion is in contact with a bottom of said mold and said peripheral preform border is in electrical contact with said mold at least partly, said fibers comprising carbon fibers, and
   (b) irradiating said preform with microwaves, without any obscuration, so that said matrix material polymerizes and said fibers and said matrix material adhesively bond to one another, such that said fiber-composite structural aircraft component is created,
      wherein said microwaves have an intensity that is low enough that arcing is substantially suppressed.

2. The method as claimed in claim 1, wherein said mold is cooled.

3. The method as claimed in claim 1 wherein said mold is cooled at points that come into contact with said preform border.

4. The method as claimed in claim 1, further comprising a subsequent working step.

5. The method as claimed in claim 4 wherein said working step is selected from the group consisting of deforming, forming, bending, painting, cleaning, machining, polishing, grinding, eroding, coating, and fitting.

6. The method as claimed in claim 1 wherein said irradiating said step is carried out in a way that a temperature gradient faints with low temperatures in a central area of the preform and high temperatures in said peripheral preform border.

7. The method as claimed in claim 1 wherein said mold is made of metal.

8. The method as claimed in claim 2 further comprising the step of actively cooling said mold.

* * * * *